(12) United States Patent
Nagano

(10) Patent No.: US 10,821,764 B2
(45) Date of Patent: Nov. 3, 2020

(54) DISPLAY BODY AND ARTICLE

(71) Applicant: TOPPAN PRINTING CO., LTD., Tokyo (JP)

(72) Inventor: Akira Nagano, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 368 days.

(21) Appl. No.: 15/641,561

(22) Filed: Jul. 5, 2017

(65) Prior Publication Data
US 2017/0297361 A1 Oct. 19, 2017

Related U.S. Application Data

(63) Continuation of application No. PCT/JP2016/050467, filed on Jan. 8, 2016.

(30) Foreign Application Priority Data

Jan. 8, 2015 (JP) ................................. 2015-002617

(51) Int. Cl.
*B42D 25/328* (2014.01)
*G09F 9/302* (2006.01)
(Continued)

(52) U.S. Cl.
CPC ........... *B42D 25/328* (2014.10); *B42D 25/21* (2014.10); *B42D 25/324* (2014.10);
(Continued)

(58) Field of Classification Search
CPC ...... G02B 5/1842; G02B 5/1861; G02B 1/11; G02B 1/118; G02B 5/1809; B42D 25/328;
(Continued)

(56) References Cited

U.S. PATENT DOCUMENTS 5,007,708 A 4/1991 Gaylord et al.
5,058,992 A 10/1991 Takahashi
(Continued)

FOREIGN PATENT DOCUMENTS

EP 2 077 459 A1 7/2009
EP 2 508 922 A1 10/2012
(Continued)

OTHER PUBLICATIONS

Hecht "Optics, Second Edition" pp. 411, 421, 425, 442 and 460 (Year: 1987).*
(Continued)

*Primary Examiner* — George G King
(74) *Attorney, Agent, or Firm* — Squire Patton Boggs (US) LLP

(57) ABSTRACT

A display body includes lattice lines that are arranged along a plane of incidence on which light is incident. The lattice lines have properties for forming a bright image with diffracted light of the incident light in an oblique view in which the plane of incidence is viewed obliquely, and absorbing some of the incident light. The surface of each of the lattice lines includes dispersed fine step parts that are repetitive in the direction in which the lattice lines extend. The steps have an antireflection function and form a dark image in a front view directly facing the plane of incidence.

10 Claims, 7 Drawing Sheets

(51) Int. Cl.
    *G02B 1/11*     (2015.01)
    *B42D 25/21*    (2014.01)
    *B42D 25/373*   (2014.01)
    *B42D 25/324*   (2014.01)
    *G09F 19/12*    (2006.01)
    *G02B 5/18*     (2006.01)
    *G02B 1/118*    (2015.01)

(52) U.S. Cl.
    CPC .............. *B42D 25/373* (2014.10); *G02B 1/11* (2013.01); *G02B 1/118* (2013.01); *G02B 5/1809* (2013.01); *G02B 5/1842* (2013.01); *G02B 5/1861* (2013.01); *G09F 9/302* (2013.01); *G09F 19/12* (2013.01)

(58) Field of Classification Search
    CPC .... B42D 25/21; B42D 25/324; B42D 25/373; G09F 9/302; G09F 19/12
    USPC .......................................... 359/566–569, 575
    See application file for complete search history.

(56) References Cited

U.S. PATENT DOCUMENTS

| | | |
|---|---|---|
| 2002/0044351 A1 | 4/2002 | Nilsen |
| 2007/0159698 A1 | 7/2007 | Taguchi et al. |
| 2008/0272883 A1* | 11/2008 | Toda .................... G02B 5/1809 340/5.8 |
| 2012/0236415 A1* | 9/2012 | Nagano ................ G02B 5/1842 359/567 |
| 2014/0226207 A1* | 8/2014 | Gangopadhyay .... G02B 5/1814 359/566 |

FOREIGN PATENT DOCUMENTS

| | | |
|---|---|---|
| EP | 3 290 967 A1 | 3/2018 |
| JP | 2005-518956 A | 6/2005 |
| JP | 4420138 B2 | 2/2010 |
| JP | 2010-85721 A | 4/2010 |
| JP | 2012-159589 A | 8/2012 |

OTHER PUBLICATIONS

International Preliminary Report on Patentability dated Jul. 11, 2017 in International Patent Application No. PCT/JP2016/050467, 5 pages.

Extended European Search Report dated Jul. 30, 2018 in European Patent Application No. 16735087.5, 7 pages.

* cited by examiner

DISPLAY BODY AND ARTICLE

BACKGROUND

The present disclosure relates to, for example, a display body for preventing counterfeiting of an article and an article with such a display body.

A display body having visual effects different from those of normal printed objects printed using inks containing dyes or pigments is attached to valuable stock certificates such as gift tickets and checks, cards such as credit cards, cash cards, and ID cards, and certificates such as passports and driver's licenses, for the purpose of preventing counterfeiting of these articles. In recent years, counterfeit articles besides these articles have been widely distributed, and thus the display body is also attached to such articles.

A display body including a diffraction grating constituted by a plurality of grooves in a substrate, that is, a relief diffraction grating is known as the display body having visual effects different from those of normal printed objects. This display body can display, for example, an image that changes depending on observation conditions or a stereoscopic image. Moreover, conventional printing techniques using the inks mentioned above cannot achieve an iridescent spectrum represented by the diffraction grating. Consequently, the display body including the diffraction grating has been widely used for the purpose of preventing counterfeiting of the articles described above (for example, see U.S. Pat. No. 5,058,992).

A display body that can display an iridescent color and a black color has been proposed as the display body including the relief diffraction grating. Such a display body has a fine structure formed by protrusions or recesses regularly arranged in an X-direction that is one direction and a Y-direction perpendicular to the X-direction at intervals less than or equal to the shortest wavelength of visible light. The protrusions or recesses constituting the fine structure suppress the reflection of light that is incident on the fine structure and display the black color in a front view in which the protrusions or recesses are observed from the front. Moreover, the protrusions or recesses constituting the fine structure function as a diffraction grating that diffracts light that is incident on the fine structure and display the iridescent color in an oblique view in which the protrusions or recesses are observed obliquely (for example, Japanese Patent No. 4420138 and Japanese Patent No. 4315334).

As described above, a fine structure displays black in a front view even if a reduced amount of light is incident on the fine structure. However, as the amount of light incident on the fine structure is reduced, it is more difficult for the fine structure to display an iridescent color in an oblique view. To prevent counterfeiting of articles more reliably, a display body preferably has a front view and an oblique view that are clearly different from each other even if a reduced amount of light is incident on the fine structure. Consequently, it is necessary to increase the brightness of diffracted light. Such a need arises not only in a display body for anti-counterfeiting but also in a display body for decorating articles or a display body that by itself is an observation target.

SUMMARY

An object of the present disclosure is to provide a display body that, when displaying a dark image in a front view and a bright image in an oblique view, displays the bright image with increased brightness, and an article.

To achieve the foregoing objective and in accordance with one aspect of the present disclosure, a display body including a plurality of lattice lines that are arranged along a plane of incidence on which light is incident is provided. The lattice lines have properties for forming a bright image with diffracted light of the incident light in an oblique view in which the plane of incidence is viewed obliquely and absorbing some of the incident light. A surface of each of the lattice lines includes a plurality of dispersed fine steps that are repetitive in a direction in which the lattice lines extend. The steps have an antireflection function and form a dark image in a front view directly facing the plane of incidence.

To achieve the foregoing objective, an article is provided that includes the above described display body.

With this aspect, the display body forms a bright image by light diffracted by the lattice lines, and thus the brightness of the bright image is increased.

In accordance with another aspect of the above described display body, an interval between the lattice lines that are adjacent to each other may be a lattice line pitch, and the lattice line pitch may include a value less than or equal to a shortest wavelength of visible light. Also, an interval between the steps that are adjacent to each other on each of the lattice lines may be a step pitch, and the step pitch may include a value less than or equal to the shortest wavelength of visible light.

With this aspect of the display body, the lattice lines and the steps form a dark image in a front view. Thus, the brightness of the dark image is further reduced as compared to a case where only the steps form a dark image.

In accordance with another aspect of the above described display body, an interval between the lattice lines that are adjacent to each other may be a lattice pitch, and the lattice line pitch may include a value less than or equal to a shortest wavelength of visible light. Also, an interval between the steps that are adjacent to each other on each of the lattice lines may be a step pitch, and the step pitch may include a value greater than the shortest wavelength of visible light.

With this aspect of the display body, the number of the steps per unit area is less than that in a case where the step pitch is less than or equal to the shortest wavelength of visible light. Thus, the brightness of a dark image is reduced by the lattice lines and the steps. Also, the accuracy of the shape of the display body is improved as compared to the case where the step pitch is less than or equal to the shortest wavelength of visible light.

In accordance with another aspect of the above described display body, an interval between the lattice lines that are adjacent to each other may be a lattice line pitch, and the lattice line pitch may include a value greater than a shortest wavelength of visible light. Also, an interval between the steps that are adjacent to each other on each of the lattice lines may be a step pitch, and the step pitch may include a value less than or equal to the shortest wavelength of visible light.

With this aspect of the display body, the angle formed by the direction in which diffracted light is emitted, that is, the direction in which a plane of incidence is viewed obliquely and the direction in which the plane of incidence is viewed from the front is small as compared to the case where the interval between the lattice lines is less than or equal to the shortest wavelength of visible light. It is thus easy to observe diffracted light emitted by the display body.

In accordance with another aspect of the above described display body, the steps may be aperiodically arranged in the direction in which the lattice lines extend.

With this aspect of the display body, the steps are aperiodically arranged in the display body. It is thus possible to prevent the steps from emitting part of incident light as diffracted light.

In accordance with another aspect of the above described display body, the steps may be periodically arranged in the direction in which the lattice lines extend.

With this aspect of the display body, the steps are periodically arranged. The steps not only form a dark image but also have an optical effect according to the step pitch.

In accordance with another aspect of the above described display body, at least a part of the plane of incidence may be made of metal.

With this aspect of the display body, a part of the plane of incidence that is formed of metal has a relatively high light reflectance.

In accordance with another aspect of the above described display body, the display body may include a plurality of display parts each including the lattice lines, and the display parts may include a display part in which at least either an interval between the lattice lines that are adjacent to each other and a direction in which the lattice lines extend varies.

With this aspect of the display body, the display parts may include display parts in which at least either the wavelength of diffracted light or the directions in which diffracted light is emitted vary. The display body thus displays a more complicated bright image as compared to a case where the display parts include only display parts with the same interval between the lattice lines that are adjacent to each other and the same direction in which the lattice lines extend.

In accordance with another aspect of the above described display body, the display body may include a plurality of display parts each including the lattice lines, and the display parts may include a display part in which at least either a rule for arranging the steps and an arranged density of the steps varies.

With this aspect of the display body, the display parts include display parts in which at least one of the type of light emitted from the steps and the brightness of a dark image formed by the steps varies. The display body thus displays a bright image and a dark image in a complicated manner as compared to a case where the display parts include only display parts with the same rule for arranging the steps and the same density of the steps.

DESCRIPTION OF EXEMPLARY EMBODIMENTS

One embodiment that embodies a display body and an article according to the present disclosure is described with reference to FIGS. 1 to 10. Hereinafter, the overall structure of the display body, a relief part of the display body, a display area of the display body, an effect of the display body, a laminated structure of the display body, and the structure of the article are described in this order.

[Overall Structure of Display Body]

The overall structure of the display body is described with reference to FIG. 1.

Figure 1:
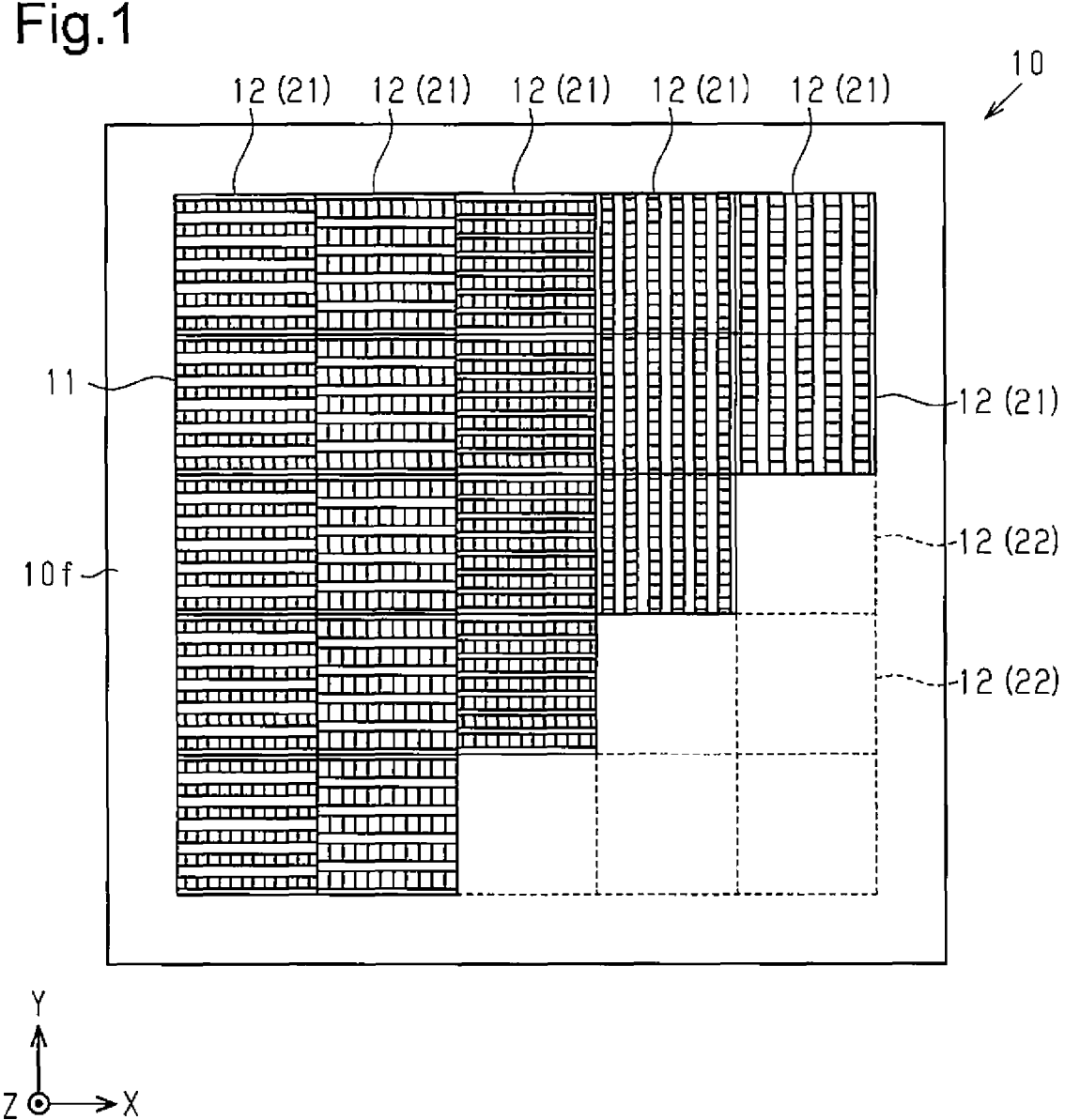
FIG. 1 is a plan view showing the planar structure of a display body according to an embodiment that embodies a display body according to the present disclosure.

As shown in FIG. 1, a display body 10 is formed in a rectangular plate shape and includes a display area 11. The display area 11 is divided into a plurality of display parts 12. The display body 10 may be formed in a polygonal plate shape other than the rectangular plate shape or in a disk plate shape. The display body 10 may include a plurality of display areas 11.

The display area 11 is divided into a plurality of display parts 12 arranged regularly. A Z-direction is a thickness direction of the display body 10, that is, a direction in which a front surface 10f, which is one of surfaces included in the display body 10, is viewed from the front. Each display part 12 has a square shape as viewed from the Z-direction. The display parts 12 are arranged in an X-direction that is one direction and a Y-direction perpendicular to the X-direction. That is, the display parts 12 are arranged in a square lattice.

The display part 12 may have a circular shape or a polygonal shape other than the square shape, for example, a triangle shape, or a quadrilateral shape such as a rectangular shape or a diamond shape, as viewed from the Z-direction. Moreover, the display parts 12 may be arranged in, other than the square lattice, for example, a rectangular lattice, or a triangular lattice.

The display parts 12 include at least some relief parts 21 each having a relief structure that includes a plurality of lattice lines. Each relief part 21 may include the relief structure on its entire square structure, or may include a relief structure and a flat surface without a relief structure. The display area 11 includes flat parts 22, which are a part of the display parts 12. Each flat part 22 includes a flat surface without the relief structure. The flat parts 22 indicated by broken lines in FIG. 1 are imaginarily divided in the same size as the relief part 21.

The display area 11 includes an area where the relief parts 21 are arranged in the X-direction and the Y-direction and an area where the flat parts 22 are arranged in the X-direction and the Y-direction. In the display area 11, the relief parts 21 and the flat parts 22 may be alternately arranged in the X-direction and the Y-direction. Alternatively, the relief parts 21 may be arranged aperiodically in the display area 11 and the flat parts 22 may be disposed in portions other than the relief parts 21.

Each relief part 21 is so small that it is impossible or difficult to distinguish the relief part 21 from other adjacent relief parts 21 with the naked eye.

For example, the X-direction length of the relief part 21 is within the range of 3 µm to 300 µm, inclusive, whereas the Y-direction length of the relief part 21 is also within the range of 3 µm to 300 µm, inclusive, as viewed from the Z-direction.

The X-direction and Y-direction lengths of the relief part 21 are less than or equal to 300 µm. Consequently, when observing the display body 10 with the naked eye, the observer hardly recognizes the shape of each relief part 21. The X-direction and Y-direction lengths of the relief part 21 are greater than or equal to 3 µm. Consequently, the relief part 21 is sufficiently large for having an optical effect. The accuracy of the shape of the relief part 21 with respect to the shape of the original plate of the relief part 21 is sufficiently high for the relief part 21 to have an optical effect.

[Structure of Relief Part]

Figure 2:
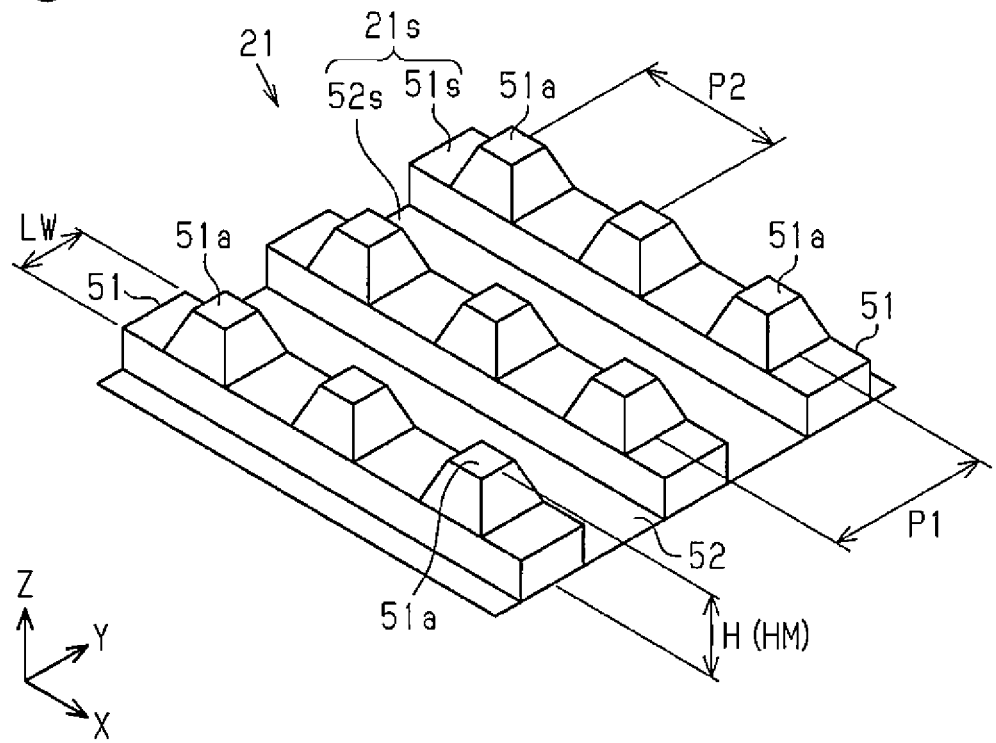
FIG. 2 is a partially enlarged perspective view of an obliquely viewed structure of the display body.

The structure of a relief part is described with reference to FIGS. 2 and 3. FIG. 2 shows an obliquely viewed structure of a part of the relief part.

As shown in FIG. 2, the relief part 21 includes a plurality of lattice lines 51 as viewed from the front surface 10f of the display body 10. Each lattice line 51 is linear and extends in the X-direction. The lattice lines 51 are arranged in the Y-direction at equal intervals.

A plurality of dispersed fine protrusions 51a is formed on a surface 51s of each of the lattice lines 51. The protrusions 51a are repeatedly formed in the X-direction, in which the lattice lines 51 extend at equal intervals, that is, periodically arranged. The protrusion 51a is an example of a step. The step is a protrusion that projects from the surface 51s of the lattice line 51 or a recess that is recessed from the surface 51s of the lattice line 51 in the Z-direction. The step is embodied as the protrusion 51a in the present embodiment.

Two lattice lines 51 in the relief part 21 that are adjacent to each other in the Y-direction form a recess 52. In the relief part 21, the surface 51s of each lattice line 51 and a surface 52s of each recess 52 form a plane of incidence 21s on which light is incident. That is, each of the lattice lines 51 is arranged along the plane of incidence 21s.

The protrusions 51a function to prevent the reflection of light that is incident on the plane of incidence 21s, thus forming a dark image in a front view in which the plane of incidence 21s is viewed from the front.

It is only necessary that the protrusions 51a are periodically arranged in the relief part 21 so as to enable the protrusions 51a to transmit part of light that is incident on the plane of incidence 21s. Additionally, it is only necessary that the relief part 21 includes a part that absorbs light having been transmitted through the plane of incidence 21s, and has transmittance that enables light to be transmitted to the absorbing part. Moreover, it is only necessary that at least the lattice line 51 in the relief part 21 functions to absorb part of light that is incident on the plane of incidence 21s.

In other words, it is only necessary that the relief part 21 includes, at its inner side, a part that converts light having been transmitted through the plane of incidence 21s into thermal energy, and has transmittance that enables light to be transmitted to the part that converts light into thermal energy.

The light absorbing part of the relief part 21 may function to reflect light. It is only necessary that light that is incident on the light absorbing part is absorbed by multi-reflection of the relief part 21.

The interval between two adjacent lattice lines 51 in the relief part 21 is referred to as a lattice line pitch P1. The lattice line pitch P1 is less than or equal to 500 nm. The lattice line pitch P1 is preferably less than or equal to 400 nm, which is the shortest wavelength of visible light. The lattice line pitch P1 is preferably greater than or equal to a half of the shortest wavelength of visible light, that is, 200 nm. The Y-direction width of the lattice line 51 in the relief part 21 is referred to as a lattice line width LW. The lattice line width LW is, for example, less than a half of the lattice line pitch P1.

In the relief part 21, the interval between two adjacent protrusions 51a in the X-direction is referred to as a step pitch P2. The step pitch P2 is within the range of 200 nm to 500 nm, inclusive. The step pitch P2 is the X-direction distance between surfaces of the protrusions 51a at relatively higher positions in the Z-direction than any other surfaces. In other words, the step pitch P2 is the distance between the tops of the protrusions 51a that are adjacent to each other in the X-direction.

The protrusion 51a is formed in a truncated quadrangular pyramid shape, which is an example of a tapered shape, which diminishes along the Z-direction. The protrusion 51a preferably has a tapered shape and may have, for example, a half-spindle shape, a cone shape such as a circular cone shape or a pyramid shape, or a truncated cone shape such as a truncated circular cone shape or a truncated pyramid shape. While all side surfaces of the protrusion 51a are inclined surfaces, the side surfaces may include a stepped surface.

When the display body 10 is formed of various resins, the display body 10 is formed using a stamper. In this case, the tapered shape of the protrusion 51a enables the stamper to be easily removed from a cured resin, thus improving the productivity of the display body 10. The protrusion 51a does not need to have a tapered shape, and may have a shape other than the tapered shape, for example, a pillar shape including a cylindrical shape and a prism shape.

To reduce the brightness of a dark image, the maximum value HM of the height H of the lattice line 51 in the Z-direction is preferably large. As the maximum value HM of the height H of the lattice line 51 is reduced, the brightness of the dark image is increased. The maximum value HM of the height of the lattice line 51 is preferably greater than or equal to a half of the lattice line pitch P1 of the lattice line 51 or a half of the step pitch P2 of the protrusion 51a.

In a case where the lattice line pitch P1 and the step pitch P2 of the lattice line 51 are 500 nm, if the maximum value HM of the height of the lattice line 51 is greater than or equal to 250 nm, the protrusions 51a can form a grayish dark image. As the maximum value HM of the height of the lattice line 51 is greater than 250 nm, the protrusions 51a can display a dark image with reduced brightness, that is, a dark image that is blackish gray or black.

The black is displayed under conditions in which, for example, when white light is irradiated onto the relief part 21 in a front view direction and the intensity of specularly reflected light is measured, all optical components within the wavelength of visible light, that is, in the range of 400 nm to 700 nm have a reflectance of 10% or less.

The gray is displayed under conditions in which, for example, when white light is irradiated onto the relief part 21 in the front view direction and the intensity of specularly reflected light is measured, all optical components within the wavelength of visible light, that is, within the range of 400 nm to 700 nm have a reflectance of approximately 25% or less.

When the maximum value HM of the height of the lattice line 51 is greater than the lattice line pitch P1 and the step pitch P2, that is, 500 nm, the protrusions 51a can display a dark image that is black. If the maximum value HM of the height of the lattice line 51 is further increased, the brightness of the dark image is further reduced.

However, even if the aspect ratio, that is, the ratio of the step pitch P2 to the maximum value HM of the height of the lattice line 51 is greater than 1.5 and the maximum value HM of the height of the lattice line 51 is greater than 750 nm, the brightness of the dark image is kept at the substantially same value. When the aspect ratio is greater than or equal to 1.5, this complicates the manufacturing of the display body 10 because, for example, it is difficult to manufacture an original plate or to keep high accuracy of the shape of the display body 10 with respect to the shape of the original shape.

The aspect ratio is thus preferably less than or equal to 1.5. Since the aspect ratio is less than or equal to 1.5, the brightness of a dark image formed by the protrusions 51a can be sufficiently reduced, and it is possible to prevent complicated manufacturing of the display body 10.

The aspect ratio is preferably greater than or equal to 0.5. When the aspect ratio is greater than or equal to 0.5, the reflectance on the lattice line 51 is reduced sufficiently for a dark image that is black or gray to be displayed.

While the maximum value HM of the height of the lattice line 51 is the same for all the protrusions 51a, the maximum value HM may be different for each of the lattice lines 51 or each of the protrusions 51a. When the maximum value HM of the height of the lattice line 51 is different for each of the lattice lines 51 or the protrusions 51a, a dark image includes portions with different brightness. The brightness of the dark image may be uneven. Consequently, when the maximum value HM is the same for all the protrusions 51a, uneven brightness hardly occurs in the dark image.

Figure 3:
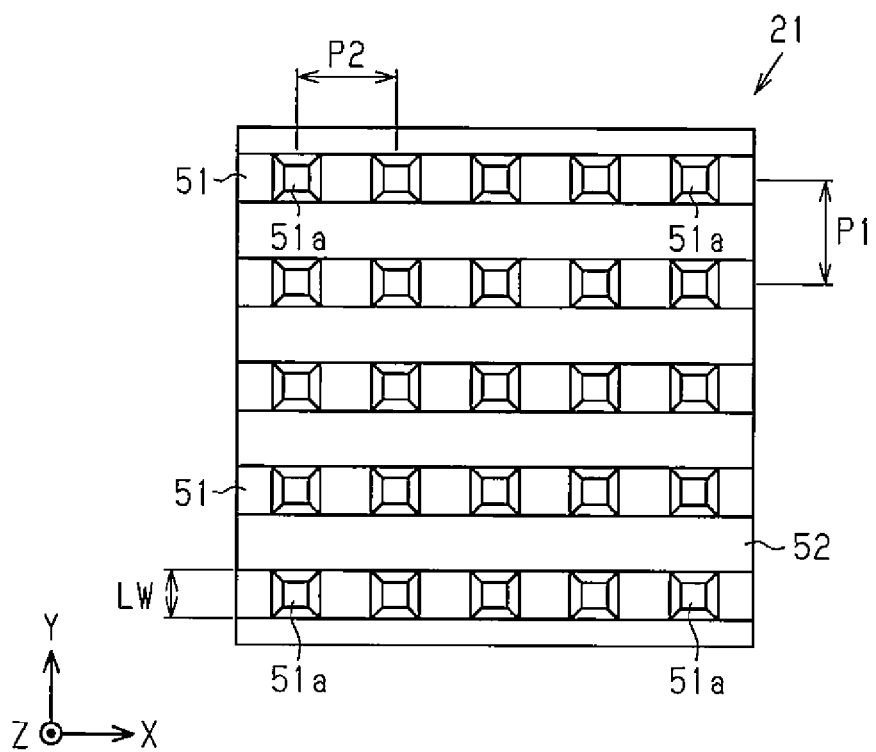
FIG. 3 is a partially enlarged plan view of a planar structure of the display body.

As shown in FIG. 3, the lattice lines 51 are regularly arranged in the relief part 21 in the Y-direction with the lattice line pitch P1. As described above, the lattice line pitch P1 is less than or equal to 500 nm, and is preferably less than or equal to the shortest wavelength of visible light, that is, 400 nm. The lattice line pitch P1 is preferably greater than or equal to a half of the shortest wavelength of visible light, that is, 200 nm.

When the lattice line pitch P1 is less than or equal to the shortest wavelength of visible light, it is determined that the relief part 21 has a refractive index that changes continuously in the Z-direction.

The protrusions 51a are arranged in the relief part 21 in the X-direction at equal intervals, that is, with the step pitch P2. The step pitch P2 is within the range of 200 nm to 500 nm, inclusive, as described above. The step pitch P2 is the X-direction distance between surfaces of the protrusions 51a at relatively higher positions in the Z-direction than any other surfaces, that is, the distance between the tops of the protrusions 51a that are adjacent to each other in the X-direction.

In the lattice line 51, when the step pitch P2 is less than or equal to the shortest wavelength of visible light, that is, 400 nm, the reflectance of specularly reflected light can be reliably reduced. The protrusions 51a thus form a dark image in a front view of the display body 10.

In a part of the lattice line 51 in which the step pitch P2 is consecutively greater than or equal to a half of the shortest wavelength of visible light, that is, 200 nm, the protrusions 51a emit first-order diffracted light. The observer views first-order diffracted light when observing the display body 10 in the X-direction. In diffracted light emitted by the display body 10, the amount of diffracted light originating from the protrusions 51a is smaller than the amount of diffracted light originating from the lattice lines 51. Diffracted light originating from the protrusions 51a is used as a criterion for determining the authenticity of the display body 10. That is, if the display body 10 emits diffracted light originating from the protrusions 51a, it is determined that the display body 10 is authentic.

In a part of the lattice line 51 in which the step pitches P2 is consecutively less than 200 nm, first-order diffracted light originating from the protrusions 51a is not emitted and the protrusions 51a have an effect of reducing the reflectance of specularly reflected light.

When the protrusions 51a are regularly arranged, the protrusions 51a are arranged in the relief part 21 more densely than in a case where the protrusions 51a are randomly arranged. The regular arrangement of the protrusions 51a enables the density of the protrusions 51a per unit area to be increased, thus further reducing the reflection of light.

The lattice line pitch P1 and the step pitch P2 may be less than or equal to the shortest wavelength of visible light or may exceed the shortest wavelength of visible light.

The bottom surface of the protrusion 51a at a position in the Z-direction that is the same as that of a surface between the protrusions 51a that are adjacent to each other in the X-direction has a square shape as viewed from the Z-direction. When the bottom surface of the protrusion 51a has a square shape, patterning is easily performed to arrange the protrusions 51a at predetermined intervals on a reference surface of the surface 51s of the lattice line 51, where the protrusions 51a are formed. When the bottom surface of the protrusion 51a has a rectangular shape other than the square shape, patterning is performed more easily to arrange the protrusions 51a at predetermined intervals, as compared to a case where the bottom surface has a circular shape or an elliptical shape.

The width of the bottom surface of the protrusion 51a in the Y-direction that is perpendicular to the direction in which the lattice lines 51 extend is substantially equal to the lattice line width LW. The protrusion 51a is formed as a part of the surface of the lattice line 51 to enable the lattice lines 51 to emit an increased amount of diffracted light.

That is, the protrusions 51a that form a dark image are not disposed in the recess 52 between two lattice lines 51 that are adjacent to each other in the Y-direction as structures separate from the lattice line 51. The recess 52 between two adjacent lattice lines 51 thus has a flat surface. The relief part 21 includes the lattice lines 51 and the recesses 52 each having a flat surface, and the lattice lines 51 and the recesses 52 are consecutively arranged in the Y-direction. The display body 10 can thus emit diffracted light originating from the lattice lines 51 and the recesses 52 with increased brightness.

The Y-direction width of the protrusion 51a is equal to the lattice line width LW in such a structure, and thus it is possible to maximize the effect of the protrusion 51a to suppress light reflection.

In case that the area of one divided relief part 21 formed in a square shape is a unit area, the density of the protrusions 51a per unit area is preferably within the range of 30% to 70%, inclusive. The density of the protrusions 51a is the ratio of the total area of bottom surfaces of the protrusions 51*a* arranged in the relief part 21 to the unit area.

When the density of the protrusions 51*a* is 50%, it is possible to maximize the effect of the protrusion 51*a* to suppress the reflection of light that is incident on the relief part 21. In such a state, a dark image formed by the protrusions 51*a* has the lowest brightness. When the density of the protrusions 51*a* is 50%, the protrusions 51*a* form, for example, a dark image that is black.

As the density of the protrusions 51*a* is reduced from 50% to 30%, the effect of the protrusion 51*a* to suppress the reflection of light that is incident on the relief part 21 is reduced. The brightness of the dark image formed by the protrusions 51*a* is increased and thus the protrusions 51*a* form a dark image that is gray. When the density of the protrusions 51*a* is less than 50%, the brightness of the dark image is increased as the density of the protrusions 51*a* is reduced.

As the density of the protrusions 51*a* is increased from 50% to 70%, the effect of the protrusion 51*a* to suppress the reflection of light that is incident on the relief part 21 is reduced. The brightness of the dark image formed by the protrusions 51*a* is increased and thus the protrusions 51*a* form a dark image that is gray. When the density of the protrusions 51*a* is greater than 50%, the brightness of the dark image is increased as the density of the protrusions 51*a* is increased.

When the density of the protrusions 51*a* is within the range of 30% to 70%, inclusive, the reflectance is kept to be less than or equal to 25% in all optical components within the wavelength of visible light, that is, in the range of 400 nm to 700 nm.

When a plurality of recesses is formed in each lattice line 51 as a plurality of steps arranged in the X-direction, the density of the recesses is the ratio of the total area of the open recesses arranged in the relief part 21 to the unit area described above.

[Display Area of Display Body]

The display area 11 of the display body 10 is described.

The display body 10 includes the relief parts 21 as described above. An azimuth angle corresponds to the direction in which the lattice lines 51 extend. The relief parts 21 may have the same azimuth angle, or may have different azimuth angles. Alternatively, the azimuth angle may be different for each group of several relief parts 21 in the display area 11.

Since the display body 10 includes the relief parts 21 with different azimuth angles, the emission direction of diffracted light differs between the relief parts 21 with different azimuth angles. When the observer obliquely views the display body 10 at a fixed point on a light incident side at which the observer faces the front surface 10*f* of the display body 10, the relief part 21 in which diffracted light is observed and the relief part 21 in which diffracted light is not observed are included in the display area 11. Since the azimuth angle differs between the relief parts 21, it is possible to display a predetermined image on the display body 10 by using the relief part 21 in which diffracted light is observed and the relief part 21 in which diffracted light is not observed.

All the relief parts 21 may have the same lattice line pitch P1 of the lattice line 51, or may have different lattice line pitches P1. Alternatively, the lattice line pitch P1 may be different for each group of several relief parts 21 in the display area 11.

The display body 10 includes the relief parts 21 with different lattice line pitches P1. The wavelength of diffracted light that is emitted from the lattice line 51 and reaches the observer thus differs between the relief parts 21 with different lattice line pitches P1 under predetermined illumination conditions. That is, the color of a bright image formed by diffracted light differs between the relief parts 21 with different lattice line pitches P1. Consequently, since the lattice line pitch P1 differs between the relief parts 21, it is possible to display an image including a plurality of colors on the display body 10 by using colors of diffracted light emitted from the relief parts 21.

All the relief parts 21 may have the same step pitch P2 and the same density of protrusions 51*a*, or may have different step pitches P2 and different densities of the protrusions 51*a*. Alternatively, the step pitch P2 and the density of the protrusions 51*a* may be different for each group of several relief parts 21.

Since the display body 10 includes the relief parts 21 with different step pitches P2, the degree to which the reflection of incident light is suppressed thus differs between the relief parts 21 with different step pitches P2. Consequently, since the density of the protrusions 51*a* differs between the relief parts 21, it is possible to display a dark image including a plurality of rays of light with different brightness on the display body 10 by using reflected light emitted from the relief parts 21.

Since the display body 10 includes the relief parts 21 with different step pitches P2, the wavelength of diffracted light that is emitted from the protrusions 51*a* and reaches the observer thus differs between the relief parts 21 with different step pitches P2 under predetermined illumination conditions. That is, the color of a bright image formed by diffracted light emitted from the protrusions 51*a* differs between the relief parts 21 with different step pitches P2.

Since the display body 10 includes the relief parts 21 with different densities of the protrusions 51*a*, the degree to which the reflection of incident light is suppressed thus differs between the relief parts 21 with different densities of the protrusions 51*a*. Consequently, since the density of the protrusions 51*a* differs between the relief parts 21, it is possible to display a dark image including a plurality of rays of light with different brightness on the display body 10 by using reflected light emitted from the relief parts 21.

[Effect of Display Body]

An effect of a display body is described with reference to FIGS. 4 and 5. Prior to description of the effect of the display body 10, an effect of a diffraction grating included in the display body 10 is described.

The diffraction grating emits diffracted light with high intensity in a predetermined direction with respect to the direction in which light that is incident on the diffraction grating travels.

An emission angle β of m-th order diffracted light (m=0, ±1, ±2 . . . ) is calculated using the following formula (1), which is an equation, when light travels through a plane that is vertical to the lengthwise direction of a groove of the diffraction grating, that is, the lengthwise direction of a recess of the diffraction grating.

$$d = m\lambda/(\sin \alpha - \sin \beta) \qquad \text{formula (1)}$$

In the formula (1), d indicates the lattice constant of the diffraction grating, m indicates the order of diffraction, and λ indicates the wavelength of incident light and diffracted light. α indicates the emission angle of transmitted light or specularly reflected light, which is 0-th order diffracted light. That is, the absolute value of the emission angle α is equal to the incident angle of irradiated light. In a reflection diffraction grating, the incident direction of irradiated light is symmetrical to the emission direction of specularly reflected light with respect to a front view direction in which the diffraction grating is observed the from the front.

The emission angle α is 0° or more and less than 90° in the reflection diffraction grating. Light is irradiated in a direction in which a plane of incidence of the diffraction grating with recesses and protrusions is inclined at a predetermined angle to the front view direction. Two angle ranges are then defined across the front view direction, that is, with a boundary value of 0°. The angle range that includes the emission direction of specularly reflected light is a positive angle range, whereas the angle range that includes the incident direction of irradiated light is a negative angle range.

When the emission direction of diffracted light and the emission direction of specularly reflected light are included in the same angle range, the emission angle β has a positive value. Meanwhile, when the emission direction of diffracted light and the incident direction of irradiated light are included in the same angle range, the emission angle β has a negative value.

When the diffraction grating is viewed in a front view, only diffracted light with an emission angle β of 0° contributes to displaying by the display body. When the lattice constant d is greater than the wavelength λ, it is possible to obtain the wavelength λ and the incident angle α that satisfy the formula (1). The observer can thus observe diffracted light with the wavelength λ that satisfies the formula (1).

In contrast, when the lattice constant d is less than the wavelength λ, it is impossible to obtain the incident angle α that satisfy the formula (1). Therefore, the observer cannot observe diffracted light emitted by the display body.

Figure 4:
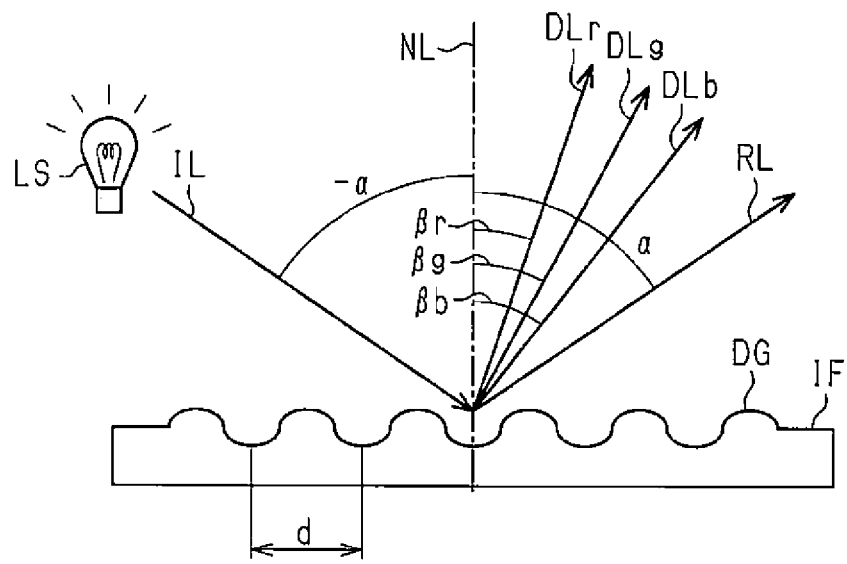
FIG. 4 is a schematic view of positive first-order diffracted light emitted by a diffraction grating with a relatively large lattice constant.

FIG. 4 schematically shows a state where a diffraction grating with a relatively large lattice constant emits first-order diffracted light. Meanwhile, FIG. 5 schematically shows a state where a diffraction grating with a relatively small lattice constant emits first-order diffracted light. In FIG. 5, components corresponding to those of FIG. 4 are denoted by the same reference numerals.

As shown in FIG. 4, a diffraction grating DG includes an interface IF that has a projecting and recessed surface, which is a surface of the diffraction grating DG. The front view direction of the interface IF is denoted by NL. The lattice constant d of the diffraction grating DG is greater than 400 nm, which is the shortest wavelength of visible light.

When white irradiated light IL including a plurality of rays of light with different wavelengths is irradiated from a light source LS onto the interface IF, the diffraction grating DG emits reflected light RL as specularly reflected light or 0-th order diffracted light. The diffraction grating DG also emits first-order diffracted light DLr having a wavelength corresponding to red, first-order diffracted light DLg having a wavelength corresponding to green, and first-order diffracted light DLb having a wavelength corresponding to blue. These rays of diffracted light are diffracted from the white irradiated light IL.

As can be seen from the formula (1), in a case where the lattice constant d of the diffraction grating DG is greater than the shortest wavelength of visible light, that is, 400 nm, when irradiated light IL is obliquely irradiated onto the interface IF, the diffraction grating DG emits first-order diffracted light DLr, DLg, DLb within the positive angle range. The emission angle β of first-order diffracted light DLr having a wavelength corresponding to red is denoted by βr, the emission angle β of first-order diffracted light DLg having a wavelength corresponding to green is denoted by βg, and the emission angle β of first-order diffracted light DLb having a wavelength corresponding to blue is denoted by βb. The diffraction grating DG also emits first-order diffracted light having a wavelength different from those of rays of diffracted light described above.

Figure 5:
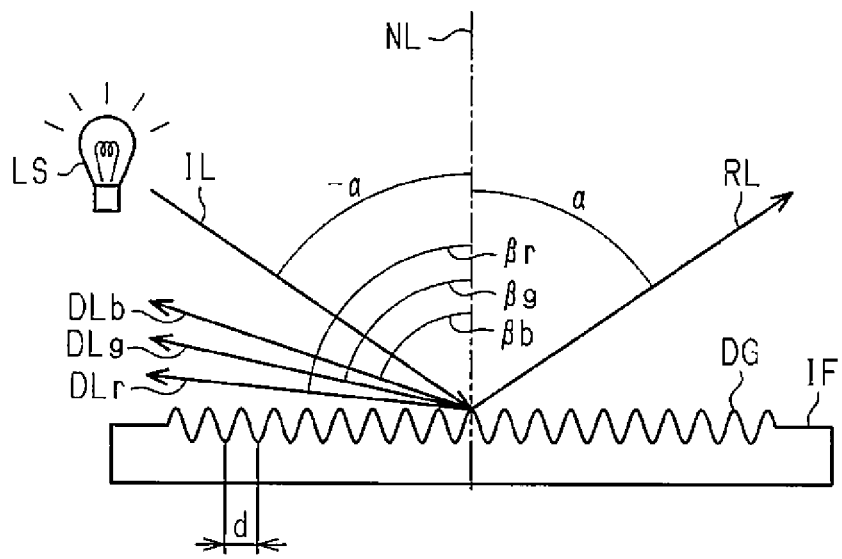
FIG. 5 is a schematic view of positive first-order diffracted light emitted by a diffraction grating with a relatively small lattice constant.

The lattice constant d of the diffraction grating DG shown in FIG. 5 is smaller than the lattice constant d of the diffraction grating DG shown in FIG. 4, and is less than or equal to the shortest wavelength of visible light, that is, 400 nm. When white irradiated light is obliquely irradiated onto the interface IF under conditions in which the lattice constant d of the diffraction grating DG is greater than a half of the shortest wavelength of visible light and less than the shortest wavelength of visible light, the diffraction grating DG emits first-order diffracted light DLr, DLg, DLb within the negative angle range. For example, when the emission angle α is 50° and the lattice constant d is 330 nm, the diffraction grating DG emits first-order diffracted light DLg of white irradiated light IL, which is green and has a wavelength λ of 540 nm, at an emission angle βg of approximately −60°.

Each of the relief parts 21 included in the display body 10 includes the lattice lines 51 that extend in the X-direction and are arranged in the Y-direction at equal intervals as described above, and thus each relief part 21 functions as a diffraction grating. The lattice line pitch P1 of the lattice line 51 in the relief part 21 is within the range of 200 nm to 500 nm, inclusive.

In the relief part 21, when the lattice line pitch P1 is less than or equal to the shortest wavelength of visible light, that is, when the lattice line pitch P1 is within the range of 200 nm to 400 nm, inclusive, the relief part 21 emits diffracted light not within the positive angle range but within the negative angle range, as described above.

In contrast, in the relief part 21, when the lattice line pitch P1 exceeds the shortest wavelength of visible light, that is, when the lattice line pitch P1 is greater than 400 nm and less than or equal to 500 nm, the relief part 21 emits diffracted light within the positive angle range.

When the observer typically observes an article, in particular, an article that has small light reflectivity and small light scattering property but has high light absorbability, the observer adjusts the relative position between a light source and the article so that the observer's eye can view specularly reflected light. When the lattice line pitch P1 is less than or equal to the shortest wavelength of visible light, the observer who does not know that the display body 10 emits diffracted light within the negative angle range usually cannot view diffracted light. The observer thus hardly finds that the display body 10 is capable of emitting diffracted light.

In contrast, when the lattice line pitch P1 exceeds the shortest wavelength of visible light, the display body 10 emits diffracted light within the positive angle range. Consequently, if the observer does not know that the display body 10 emits diffracted light within the positive angle range, the observer is highly likely to view diffracted light. In the case where the lattice line pitch P1 exceeds the shortest wavelength of visible light, the angle formed by the front view direction and the direction in which diffracted light is emitted is smaller than that in the case where the lattice line pitch P1 is less than or equal to the shortest wavelength of visible light. The observer thus easily views diffracted light emitted by the display body 10 in which the lattice line pitch P1 exceeds the shortest wavelength of visible light.

As described above, if the protrusion 51a is formed in a tapered shape, and the lattice line pitch P1 and the step pitch P2, that is, the distance between the protrusions 51a that are adjacent to each other in the X-direction, are sufficiently small, it is determined that the relief part 21 has a refractive index that continuously changes in the Z-direction. If the plane of incidence 21s of the display body 10 is viewed at any angle on the light incident side, the reflectance of specularly reflected light is low in the relief part 21.

To reduce the reflectance of specularly reflected light in the relief part 21, one of the lattice line pitch P1 and the step pitch P2 is preferably less than or equal to the shortest wavelength of visible light, and more preferably, both the lattice line pitch P1 and the step pitch P2 are less than or equal to the shortest wavelength of visible light.

When the lattice line pitch P1 is less than or equal to the shortest wavelength of visible light and the step pitch P2 is also less than or equal to the shortest wavelength of visible light in the relief part 21 described above, the relief part 21 does not emit diffracted light in the front view direction of the relief part 21, and has low reflectance of specularly reflected light in the front view direction. The relief part 21 thus displays a dark image that has a color between black and gray in a front view. When the observer observes the relief part 21 in a front view, it seems to the observer that the relief part 21 is a print layer that has a color between black and gray.

When conditions for irradiating light onto the display body 10 include a condition in which the angle at which the observer observes the display body 10 is within the negative angle range, the relief part 21 emits diffracted light that has a predetermined color. That is, the relief part 21 forms a bright image that has a predetermined color in an oblique view.

When the lattice line pitch P1 exceeds the shortest wavelength of visible light and the step pitch P2 is less than or equal to the shortest wavelength of visible light in the relief part 21 described above, the relief part 21 has the similar effect as the relief part 21 described above. That is, the relief part 21 does not emit diffracted light in the front view direction of the relief part 21, and has low reflectance of specularly reflected light in the front view direction.

When the conditions for irradiating light onto the display body 10 include a condition in which the angle at which the observer observes the display body 10 is within the positive angle range, the relief part 21 emits diffracted light that has a predetermined color.

When the lattice line pitch P1 is less than or equal to the shortest wavelength of visible light and the step pitch P2 exceeds the shortest wavelength of visible light in the relief part 21 described above, the reflectance of light specularly reflected by the protrusions 51a is higher than that in the case where the step pitch P2 is less than or equal to the shortest wavelength of visible light. However, the lattice line pitch P1 is less than or equal to the shortest wavelength of visible light and thus the lattice lines 51 can suppress the reflection of light in the front view direction. Consequently, the relief part 21 can form a dark image.

Figure 6:
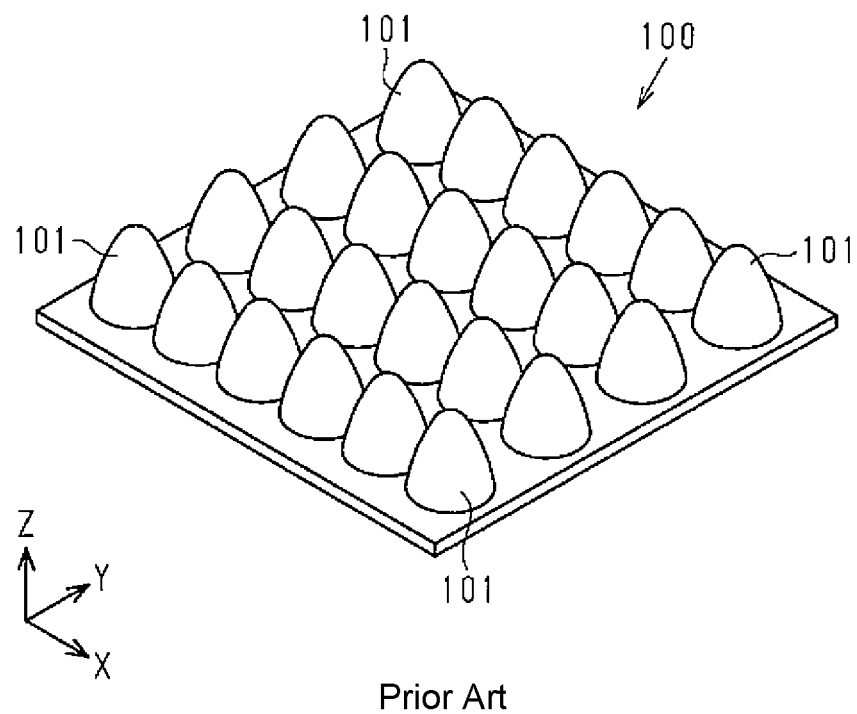
FIG. 6 is a perspective view of an obliquely viewed structure of a conventional display body in which its relief part includes only a plurality of protrusions.

In contrast, a conventional relief part 100 that includes only a plurality of protrusions 101 emits diffracted light originating from a periodic arrangement of the protrusions 101, as shown in FIG. 6. The relief part 100 does not include the lattice lines 51 unlike the relief part 21 according to the present embodiment. The area of a portion of the relief part 100 that emits diffracted light in the X-direction is thus reduced. Consequently, the amount of diffracted light emitted by the relief part 100 is smaller than that of the relief part 21 according to the present embodiment, and thus the brightness of light that is observed by the observer is reduced.

According to the relief part 21 of the present embodiment, the relief part 21 includes the lattice lines 51 and thus the amount of diffracted light emitted by the relief part 21 is increased. Consequently, when a dark image is displayed in a front view and a bright image is displayed in an oblique view, the bright image is displayed with increased brightness.

The display body 10 according to the present embodiment forms a dark image in a front view and a bright image in an oblique view. Consequently, to counterfeit the display body 10, it is necessary to configure the display body 10 so that both the dark image and the bright image are formed. Counterfeiting of a display body is thus more difficult compared to a display body that forms only one of a dark image and a bright image.

[Laminated Structure of Display Body]

A structure that can be used as the display body 10 described above is described with reference to FIGS. 7 and 8. In the display body 10, the flat part 22 is different from the relief part 21 in that the flat part 22 does not include a relief structure. However, materials for layers of the display body 10 and the laminated structure in the relief part 21 are common to those in the flat part 22. Descriptions of the structure of the relief part 21 in the display body 10 are given below and descriptions of the structure of the flat part 22 are omitted.

Figure 7:
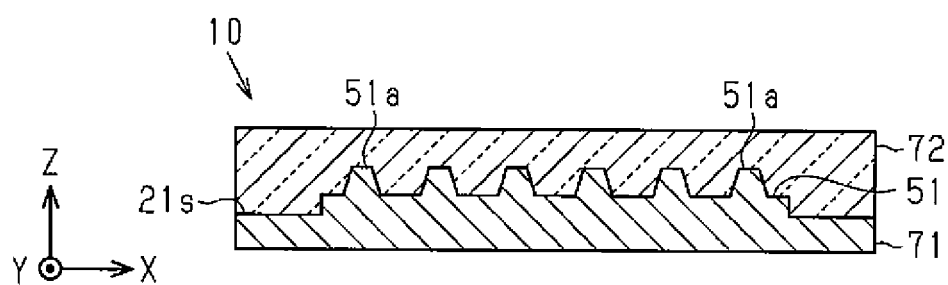
FIG. 7 is a partial cross-sectional view showing a cross-sectional structure of an example of the display body.

As shown in FIG. 7, an example of the display body 10 includes a relief layer 71 and a covering layer 72 that covers, among surfaces included in the relief layer 71, a surface having the lattice lines 51 disposed thereon. The plane of incidence 21s of the display body 10 is a surface of the relief layer 71 that is in contact with the covering layer 72. The plane of incidence 21s includes the lattice lines 51 arranged in a direction perpendicular to the plane of drawing at equal intervals. The protrusions 51a are formed on each lattice line 51 in the direction in which the lattice lines 51 extend.

Among surfaces included in the covering layer 72, the front surface of the display body 10 is a flat surface, which is opposite to a surface in contact with the relief layer 71. The rear surface of the display body 10 is a surface of the relief layer 71 that is opposite to a surface in contact with the covering layer 72.

Examples of materials for forming the relief layer 71 include aluminum, silver, gold, and alloys of such metals. The plane of incidence 21s of the relief layer 71 is formed of metal, in other words, the plane of incidence 21s is made of metal, and thus the reflectance of light on the plane of incidence 21s is increased.

Light is incident on the display body 10 from its front surface. At least one of the group of the lattice lines 51 and group of the protrusions 51a is periodically arranged on the plane of incidence 21s so as to enable light reflection to be suppressed. The reflection of light on the plane of incidence 21s is thus suppressed and part of light that is incident on the plane of incidence 21s is transmitted through the relief layer 71. Light that travels inside of the relief layer 71 is then absorbed by the relief layer 71, that is, then converted into thermal energy within the relief layer 71.

Part of light that is incident on the plane of incidence 21s is reflected by the plane of incidence 21s and part of light that is reflected by the plane of incidence 21s is incident on the plane of incidence 21s again, and part of incident light is absorbed by the relief layer 71. Since light is absorbed by the relief layer 71 multiple times, it is possible to suppress the reflection of light on the plane of incidence 21s and the transmission of light through a surface of the relief layer 71 that is opposite to the plane of incidence 21s.

The covering layer 72 has a light transmission property, and is made of, for example, a thermoplastic resin, a thermosetting resin, or a photosetting resin.

If the display body 10 includes the relief layer 71 and the covering layer 72, the plane of incidence 21s of the relief layer 71 is not exposed to the outside of the display body 10. The plane of incidence 21s is thus less damaged compared to a case where the display body 10 does not include the covering layer 72. Consequently, the display body 10 can display an image with improved visibility.

The display body 10 may be formed by coating a resin for forming the covering layer 72 on the relief layer 71 formed by physically or chemically etching a metal layer. Alternatively, the display body 10 may be formed as follows. That is, the covering layer 72 that functions as a recessed plate for forming the relief layer 71 is formed, and a metal layer is then formed on the covering layer 72.

Figure 8:
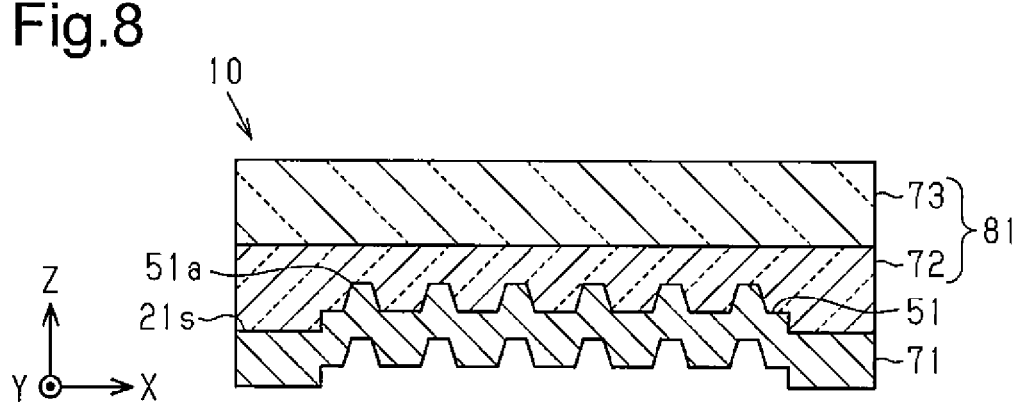
FIG. 8 is a partial cross-sectional view showing a cross-sectional structure of an example of the display body.

As shown in FIG. 8, an example of the display body 10 is a laminate of the relief layer 71 and a light transmitting layer 81. The front surface of the display body 10 is a surface of the light transmitting layer 81 that is opposite to a surface that is in contact with the relief layer 71. The rear surface of the display body 10 is a surface of the relief layer 71 that is opposite to the light transmitting layer 81. The rear surface may be a surface constituted by the light transmitting layer 81. In this case, the front surface may be a surface constituted by the relief layer 71.

The light transmitting layer 81 is a laminate constituted by a support layer 73 and the covering layer 72, and the covering layer 72 is interposed between the support layer 73 and the relief layer 71. When the front surface is a surface of the light transmitting layer 81 that is opposite to the surface in contact with the relief layer 71, the plane of incidence 21s is a surface of the relief layer 71 in contact with the covering layer 72. When the front surface is a surface of the relief layer 71 that is opposite to the surface in contact with the light transmitting layer 81, the front surface is also a plane of incidence.

The light transmitting layer 81 may have a multi-layered structure of three or more layers including the support layer 73, the covering layer 72, and other layers. In this case, other layers may be disposed, for example, between the support layer 73 and the covering layer 72 or on a surface of the support layer 73 that is opposite to the covering layer 72.

The support layer 73 is a film or a sheet that can be handled alone. Materials for forming the support layer 73 include a resin having a light transmission property such as polycarbonate and polyester.

For example, the covering layer 72 is formed by a step of coating a resin on the support layer 73 to form a coating and a step of pressing a stamper against the coating to cure the resin that forms the coating. Materials for forming the covering layer 72 include, for example, a thermoplastic resin, a thermosetting resin, and a photosetting resin.

While the relief layer 71 is formed on the overall surface of the covering layer 72 that is in contact with the relief layer 71, the relief layer 71 may be formed on only a part of the surface of the covering layer 72 that is in contact with the relief layer 71. That is, the relief layer 71 may include only the lattice lines 51 and does not need to include the recess 52 between two lattice lines 51 that are adjacent to each other in a direction perpendicular to the plane of drawing. In this case, the recess 52 is formed by the covering layer 72.

The relief layer 71 is formed with any of the metals and alloys described above. The plane of incidence 21s of the relief layer 71 is made of metal and thus the plane of incidence 21s has relatively high light reflectance.

Like the display body 10 described with reference to FIG. 7, the reflection of light on the plane of incidence 21s is suppressed and part of light that is incident on the plane of incidence 21s is transmitted through the relief layer 71. A light that travels inside of the relief layer 71 is absorbed by the relief layer 71. Since part of light that is incident on the plane of incidence 21s is absorbed by the relief layer 71 multiple times, it is possible to suppress the reflection of light on the plane of incidence 21s and the transmission of light through a surface of the relief layer 71 that is opposite to the plane of incidence 21s.

For example, the relief layer 71 is formed by vapor-phase deposition such as vacuum deposition or sputtering. When the relief layer 71 is formed on a part of the surface of the covering layer 72 that is in contact with the relief layer 71, the relief layer 71 is formed as follows. That is, the relief layer 71 is formed by a step of forming a metal thin layer on portions of the surface covering layer 72 with recesses and protrusions by vapor-phase deposition and a step of patterning the thin layer.

At the step of patterning the thin layer, a part of the thin layer may be dissolved using alkaline or acid chemicals. Alternatively, a part of the thin layer may be peeled off using an adhesive material that has adhesive strength greater than that of the thin layer and the covering layer 72.

The relief layer 71 that is disposed on a part of a surface of the covering layer 72 that is in contact with the relief layer 71 may be formed by vapor-phase deposition using a mask.

The display body 10 may include, in addition to the light transmitting layer 81 and the relief layer 71 described above, other layers including an adhesion layer, a sticking layer, and a resin layer.

When the display body 10 includes at least one of the adhesion layer and the sticking layer, it is only necessary that the adhesion layer or the sticking layer covers a surface of the relief layer 71 that is opposite to the covering layer 72, and functions as the rear surface of the display body 10. When the display body 10 includes both the light transmitting layer 81 and the relief layer 71, the shape of the rear surface constituted by the relief layer 71 is usually the same as the shape of the interface of the light transmitting layer 81 and the relief layer 71. If at least one of the adhesion layer and the sticking layer constitutes the rear surface of the display body 10, it is possible to prevent the surface of the relief layer 71 from being exposed to the outside of the display body 10.

The shape of the rear surface of the display body 10 that is included in at least one of the adhesion layer and the sticking layer is obtained by smoothening the shapes of the structures on the surface of the relief layer 71, and thus is different from the shape of the surface of the relief layer 71. Consequently, it is difficult to duplicate the display body 10 for the purpose of counterfeiting.

The relief layer 71 of the display body 10 does not need to be made of metal, and may be embodied as the following layer. That is, the relief layer 71 may be an adhesion layer or a sticking layer that covers a recessed and projecting structure formed on the covering layer 72 so as to correspond to the lattice lines 51. In such a case, the adhesion layer or the sticking layer has a light reflecting property and a light absorbing property.

When the rear surface of the display body 10 is a surface of the light transmitting layer 81 that is opposite to the relief layer 71 and the front surface thereof is a surface of the relief layer 71 that is opposite to the light-transmitting layer 81, it is only necessary that at least one of the adhesion layer and the sticking layer is formed on the surface of the light transmitting layer 81 that is opposite to the surface in contact with the relief layer 71. When the front surface of the display body 10 is the surface of the relief layer 71 that is opposite to the light-transmitting layer 81 and is also a plane of incidence, a light blocking layer, in addition to the light transmitting layer 81 or instead of the light transmitting layer 81, may be disposed behind the relief layer 71.

It is only necessary that a resin layer included in the display body 10 is disposed on a laminate of the light transmitting layer 81 and the relief layer 71 as a layer that constitutes the front surface of the display body 10. For example, when the relief layer 71 is disposed on the front surface side of the light transmitting layer 81 and covered by the resin layer, it is possible to prevent the relief layer 71 from being damaged. Additionally, since the relief layer 71 is covered by the resin layer, it is difficult to duplicate the relief part 21 for the purpose of counterfeiting.

Examples of the resin layer include a hard coat layer for preventing the front surface of the display body 10 from being scratched, an antifouling layer for preventing the display body 10 from being contaminated, an antireflection layer for preventing light reflection on the front surface of the display body 10, and an antistatic layer for preventing charging on the display body 10.

The display body 10 may further include a print layer. It is only necessary that the print layer is disposed on a side of the relief layer 71 at which the light transmitting layer 81 is disposed. That is, the print layer may be disposed on a surface of the support layer 73 that is opposite to a surface in contact with the covering layer 72, may be interposed between the support layer 73 and the covering layer 72, or may be interposed between the covering layer 72 and the relief layer 71. When the display body 10 includes the print layer, the information that can be displayed by the display body 10 is added using the print layer, and thus the display body 10 can display a more complicated image. The print layer also enables the information to be added to the display body 10 more easily than in a case where the information is added using the relief structure.

[Structure of Article]

Figure 9:
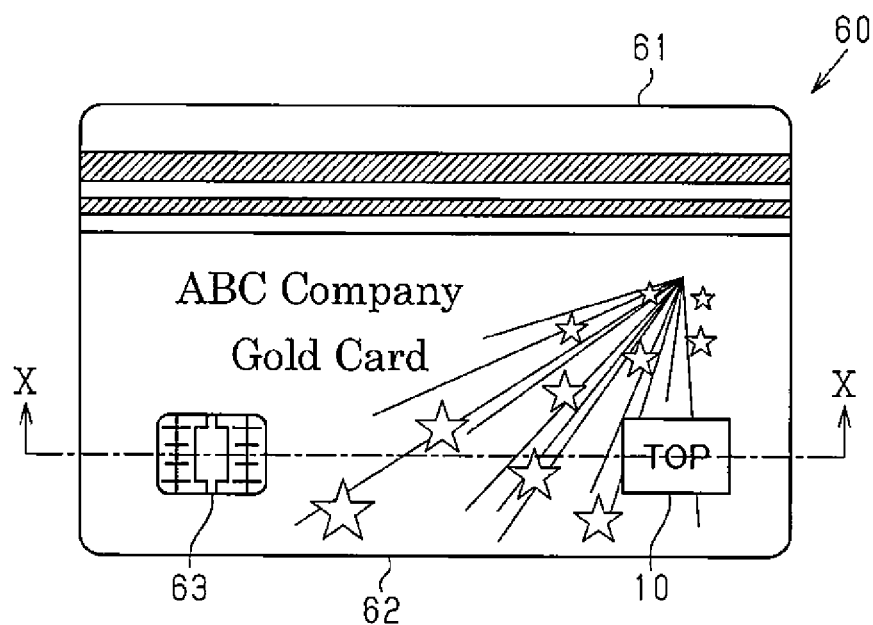
FIG. 9 is a plan view of a schematic structure of an IC card according to an embodiment of one of articles with the display body.
Figure 10:
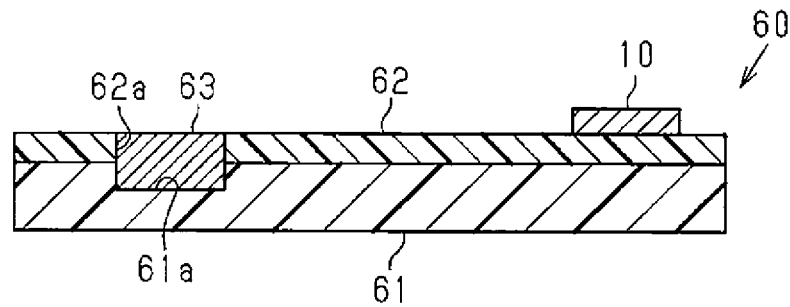
FIG. 10 is a cross-sectional view showing a cross-sectional structure taken along line X-X in FIG. 9.

An example in which an article is embodied as an IC card is described as an embodiment of an article with the display body 10, with reference to FIGS. 9 and 10.

As shown in FIG. 9, an IC (integrated circuit) card 60 includes a base 61 that has a plate shape and is made of, for example, plastic, a print layer 62 having a predetermined image printed thereon, an IC chip 63, and the display body 10.

As shown in FIG. 10, the print layer 62 is formed on the base 61, and the display body 10 described above is fixed on a display surface of the print layer 62 that is opposite to a surface in contact with the base 61 by using, for example, a sticking layer. For example, the display body 10 is prepared as a sticker with a sticking layer or a transfer foil, and adhered to the print layer 62.

A recess 61a is formed in the base 61. The recess 61a is recessed from a part of the surface of the base 61 in contact with the print layer 62 toward a surface of the base 61 that is opposite to the surface in contact with the print layer 62. A through-hole 62a is formed at a position on the print layer 62 that matches the recess 61a in a thickness direction of the IC card 60. The IC chip 63 is fitted into the recess 61a and the through-hole 62a. The IC chip 63 includes a plurality of electrodes on its surface surrounded by the print layer 62. Information is written in the IC chip 63 through the electrodes, and information recorded in the IC chip 63 is read from the IC chip 63 through the electrodes.

The IC card 60 includes the display body 10 that is difficult to counterfeit, and thus the IC card 60 itself is also difficult to counterfeit. The IC card 60 includes, in addition to the display body 10, the IC chip 63 and the print layer 62, and thus it is possible to prevent counterfeiting by using the IC chip 63 and the print layer 62.

As described above, the embodiment of a display body and an article has the following advantages.

(1) The display body 10 forms a bright image by light diffracted by the lattice lines 51, and thus the brightness of the bright image is increased.

(2) When both the lattice line pitch P1 and the step pitch P2 are less than or equal to the shortest wavelength of visible light, the lattice lines 51 and the protrusions 51a form a dark image in a front view. The brightness of the dark image is further reduced as compared to a case where only the protrusions 51a form a dark image.

(3) When the lattice line pitch P1 is less than or equal to the shortest wavelength of visible light and the step pitch P2 exceeds the shortest wavelength of visible light, the number of the protrusions 51a per unit area is less than that in a case where the step pitch P2 is less than or equal to the shortest wavelength of visible light. Thus, the brightness of a dark image is reduced by the lattice lines 51 and the protrusions 51a, and the simultaneously, the accuracy of the shape of the display body 10 is improved as compared to the case where the step pitch P2 is less than or equal to the shortest wavelength of visible light.

(4) When the lattice line pitch P1 exceeds the shortest wavelength of visible light and the step pitch P2 is less than or equal to the shortest wavelength of visible light, the angle formed by the direction in which diffracted light is emitted, that is, the direction in which a plane of incidence is viewed obliquely and the front view direction in which the plane of incidence is viewed from the front is small. It is thus easy to observe diffracted light emitted by the display body 10.

(5) The protrusions 51a are periodically arranged. Thus, the protrusions 51a not only form a dark image but also have an optical effect according to the step pitch P2.

(6) At least a part of the plane of incidence 21s is formed of the relief layer 71 made of metal. Thus, the part of the plane of incidence 21s that is formed of the relief layer 71 has relatively high light reflectance.

(7) The relief parts 21 may include relief parts 21 in which at least one of the lattice line pitch P1 of the lattice lines 51 and the direction in which the lattice lines 51 extend is different from each other. In this case, the relief parts 21 include the relief parts 21 in which at least one of the wavelength of diffracted light and the direction in which diffracted light is emitted is different from each other, and thus the display body 10 displays a more complicated bright image.

(8) The relief parts 21 may include relief parts 21 having different rules for arranging at least either the protrusions 51a or the density of the protrusions 51a. In this case, the relief parts 21 include display parts in which at least one of the type of light emitted from the protrusions 51a and the brightness of a dark image formed by the protrusions 51a is different from each other, and thus the display body 10 displays a bright image and a dark image in a complicated manner.

Other Embodiments

Other embodiments are described with reference to FIGS. 11 to 13. Three embodiments that are different from the embodiment described above are described below in order.

Figure 11:
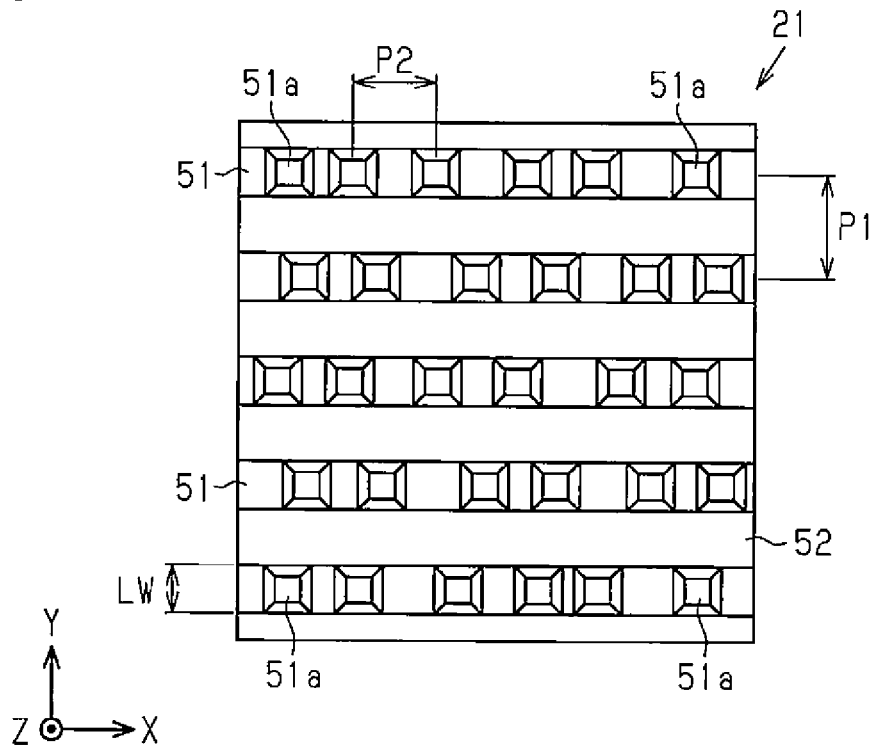
FIG. 11 is a plan view showing a planar structure of a display body according to another embodiment.
Figure 12:
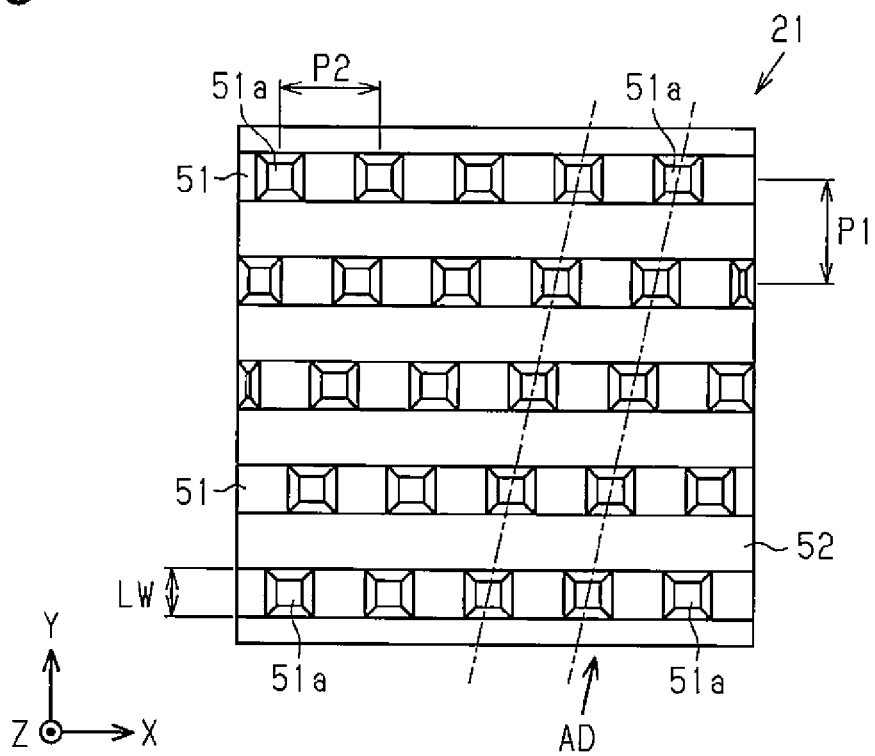
FIG. 12 is a plan view showing a planar structure of a display body according to still another embodiment.
Figure 13:
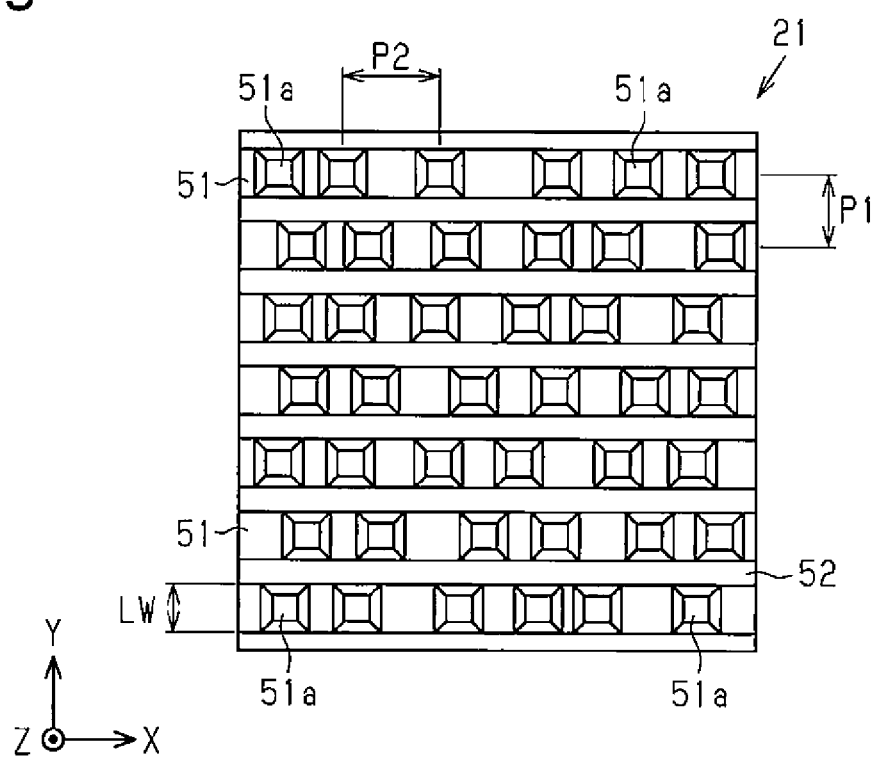
FIG. 13 is a plan view showing a planar structure of a display body according to still another embodiment.

In FIGS. 11 to 13, the same structures as in the embodiment described above are denoted by the same reference numerals, and descriptions thereof are omitted.

As shown in FIG. 11, protrusions 51a included in a lattice line 51 are arranged aperiodically in an X-direction. When the protrusions 51a are arranged aperiodically, a step pitch P2 is within the range of 200 nm to 500 nm, inclusive. The step pitch P2 is preferably less than or equal to 500 nm, and is more preferably less than or equal to 400 nm, that is, the shortest wavelength of visible light. The step pitch P2 is preferably greater than or equal to 200 nm.

The average value calculated by dividing the total of the step pitches P2 by the number of the step pitches P2 is preferably within the range of 200 nm to 500 nm, inclusive. The most frequent value, which is a value obtained most frequently among values of the step pitch P2, is more preferably within the range of 200 nm to 500 nm, inclusive. All the values of the step pitch P2 are more preferably within the range of 200 nm to 500 nm, inclusive.

The maximum value P2M among the values of the step pitch P2 is preferably 500 nm, whereas the minimum value P2m is preferably 200 nm.

This configuration has the following advantages.

(9) It is possible to reduce the emission of diffracted light due to arrangement in the X-direction of the protrusions 51a in the display body 10 at equal intervals.

When the relief part 21 is viewed in the X-direction, that is, the direction in which the lattice lines 51 extend under certain illumination conditions, white scattering light emitted from the protrusions 51a aperiodically arranged in the X-direction is observed. When the relief part 21 of the display body 10 is viewed in a Y-direction, diffracted light is observed. Meanwhile, when the relief part 21 is viewed in the X-direction that is rotated from the Y-direction by 90°, white scattering light that has a different hue from that of diffracted light is observed.

One way to determine whether the display body 10 is genuine or counterfeit is to check that the hue of light viewed in the Y-direction is different from the hue of light viewed in the X-direction.

As shown in FIG. 12, protrusions 51a included in one lattice line 51 are arranged in the X-direction at equal intervals. Meanwhile, the protrusions 51a are arranged in one relief part 21 in an arrangement direction AD crossing the Y-direction at equal intervals. The color of diffracted light that reaches a fixed point is thus different from that in a case where the protrusions 51a are arranged in one relief part 21 in the Y-direction at equal intervals. Since the protrusions 51a are arranged in the arrangement direction AD crossing the Y-direction, it is possible to emit diffracted light originating from the protrusions 51a to the relief part 21 in a direction crossing the X-direction.

As shown in FIG. 13, the lattice line width LW of each lattice line 51 is greater than or equal to a half of a lattice line pitch P1. The amount of diffracted light emitted by the lattice line 51 is not greatly affected by the lattice line width LW of the lattice line 51. On the other hand, when the lattice line width LW of the lattice line 51 is increased, that is, when the area of a recess 52 between two adjacent lattice lines 51 in the Y-direction is reduced, the area of the relief part 21 occupied by the lattice lines 51 is increased. That is, such a structure is preferable in order to reduce the brightness of a dark image formed by the relief part 21.

The lattice line pitch P1 may be less than or equal to the shortest wavelength of visible light or may exceed the shortest wavelength of visible light in the three relief parts 21 described in other embodiments. The step pitch P2 may be less than or equal to the shortest wavelength of visible light or may exceed the shortest wavelength of visible light. Since the lattice line pitch P1 and the step pitch P2 are within the ranges described above in other embodiments, advantages that are equivalent to those of the embodiment described above can be obtained in other embodiments.

The relief parts 21 that constitute the display area 11 may include relief part 21 according to the embodiment described above and three types of the relief parts 21 according to other embodiments in any combination thereof. When the relief parts 21 include the relief parts 21 in which at least one of a rule for arranging the protrusions 51a, that is, the step pitch P2 and the arrangement periodicity of the protrusions 51a is different from each other, an advantage that is similar to (8) described above can be obtained.

[Modifications]

The above-described embodiments may be modified as follows.

The article may be other cards such as magnetic cards, wireless cards, and ID (identification) cards. Alternatively, the article may be valuable stock certificates such as gift tickets and stock certificates, articles that needs be confirmed as being genuine such as brand-name products and works of art, or packages or a part of packages that accommodate an article that needs to be confirmed as being genuine.

When the base of the article is made of paper, the display body 10 may be supported by the article as follows. That is, the base is watermarked with the display body 10, and an opening is formed at a position on the base that overlaps the display body 10 in a thickness direction of the base. In this way, the display body 10 is supported by the article.

When the base is made of a light transmitting material, the display body 10 may be embedded in the base, or may be fixed on the rear surface of the base, that is, a surface of the base that is the farthest from a display surface of the display body 10.

In case that a surface that forms the surface 51s of the lattice line 51 is set as a reference surface, the surface 51s of the lattice line 51 may include both a protrusion that projects from the reference surface in a Z-direction and a recess that is recessed from the reference surface in the Z-direction.

When the display body 10 includes a plurality of display areas 11, each display area 11 may be provided with a part having an optical effect different from the display part 12 described above. In such a case, it is only necessary that the display body 10 includes, for example, a light scattering pattern, a light collection pattern, or a diffraction grating that constitutes a part of the display area 11.

For example, the light scattering pattern is a surface on which steps are irregularly formed. The steps have different sizes in its width direction, different shapes, and different height differences from the reference surface. Light that is incident on the light scattering pattern reflects diffusely in all directions, and thus is observed by the observer as white or white cloudy light. The step of the light scattering pattern has, for example, a width of 3 μm or more and a height difference of 1 μm or more. The width and the height difference of the step in the light scattering pattern are greater than the width and the height difference of a recessed and projecting structure included in the relief part 21. If the interval between the steps and the shape of the step are determined according to a predetermined rule, the light scattering pattern can have directive light scattering characteristics.

The light collection pattern is a lens pattern for a microlens or a Fresnel lens. The light collection pattern can be formed if the thickness of the display body 10 is relatively smaller than that in a case where other lenses are used. It seems to the observer that incident light that is incident on these lens patterns is collected on a light incident side or a rear surface side with respect to a surface of the display body 10, and thus special visual effects are added to the display body 10.

Unlike the relief part 21 described above, the diffraction grating does not form a dark image in a front view and forms a bright image by diffracted light in an oblique view. The lattice line pitch of the diffraction grating is preferably 0.5 µm or more and 3 µm or less.

The structure of the plane of incidence 21s of the display body 10 described above enables the display body 10 to have a more complicated optical effect, and thus it is more difficult to counterfeit the display body 10.

The display body 10 does not need to be a display body used for the purpose of preventing counterfeiting of an article. The display body 10 may be, for example, a display body for decorating an article or a toy or a learning material in which a display body by itself is an observation target.

DESCRIPTION OF THE REFERENCE NUMERALS

10: Display body
10f: Front surface
11: Display area
12: Display part
21, 100: Relief part
21s: Plane of incidence
22: Flat part
51: Lattice line
51a, 101: Protrusion
51s, 52s: Surface
52, 61a: Recess
60: IC card
61: Base
62: Print layer
62a: Through-hole
63: IC chip
71: Relief layer
72: Covering layer
73: Support layer
81: Light transmitting layer
DG: Diffraction grating
IF: Interface

The invention claimed is:

1. A display body comprising a relief structure, wherein the relief structure comprises:
a plurality of lattice lines that extend along a first direction in a plane of incidence on which light is incident and that are located on a surface and arranged along a second direction crossing the first direction in the plane of incidence, wherein the plurality of lattice lines diffract the incident light, each lattice line is a protrusion that protrudes from the surface, each lattice line is continuous in the first direction and has a rectangular cross section, an interval between the lattice lines that are adjacent to each other is a lattice line pitch, the lattice line pitch includes a value less than or equal to a shortest wavelength of visible light, and the plane of incidence is made of metal;
a plurality of recesses, each of which is between the two adjacent lattice lines in the first direction; and
a plurality of dispersed fine steps formed on a surface of each lattice line, wherein an interval between the fine steps that are adjacent to each other on each of the lattice lines is a step pitch, the step pitch includes a value less than or equal to the shortest wavelength of visible light, and the plurality of fine steps prevent reflection of the incident light;
the relief structure forms a bright image with diffracted light of the incident light in an oblique view in which the plane of incidence is viewed obliquely by diffracting the incident light at the plurality of lattice lines; and
the relief structure forms a dark image in a front view directly facing the plane of incidence by preventing reflection of the incident light at the plurality of fine steps.

2. The display body according to claim 1, wherein the fine steps are aperiodically arranged in the direction in which the lattice lines extend.

3. The display body according to claim 1, wherein the fine steps are periodically arranged in the direction in which the lattice lines extend.

4. The display body according to claim 1, further comprising a plurality of display parts each including the lattice lines,
wherein the display parts include a display part in which at least either an interval between the lattice lines that are adjacent to each other or a direction in which the lattice lines extend varies.

5. The display body according to claim 1, further comprising a plurality of display parts each including the lattice lines,
wherein the display parts include a display part in which at least either a rule for arranging the fine steps or an arranged density of the fine steps varies.

6. An article comprising a display body and a base, wherein
the display body comprises a relief structure,
the relief structure comprises:
a plurality of lattice lines that extend along a first direction in a plane of incidence on which light is incident and that are located on a surface and arranged along a second direction crossing the first direction in the plane of incidence, wherein the plurality of lattice lines diffract the incident light, each lattice line is a protrusion that protrudes from the surface, each lattice line is continuous in the first direction and has a rectangular cross section, an interval between the lattice lines that are adjacent to each other is a lattice line pitch, the lattice line pitch includes a value less than or equal to a shortest wavelength of visible light, and the plane of incidence is made of metal;
a plurality of recesses, each of which is between the two adjacent lattice lines in the first direction; and
a plurality of dispersed fine steps formed on a surface of each lattice line, wherein an interval between the fine steps that are adjacent to each other on each of the lattice lines is a step pitch, the step pitch includes a value less than or equal to the shortest wavelength of visible light, and the plurality of fine steps prevent reflection of the incident light;
the relief structure forms a bright image with diffracted light of the incident light in an oblique view n which the plane of incidence is viewed obliquely by diffracting the incident light at the plurality of lattice lines, and
the relief structure forms a dark image in a front view directly facing the plane of incidence by preventing reflection of the incident light at the plurality of fine steps.

7. The article according to claim 6, wherein the fine steps are aperiodically arranged in the direction in which the lattice lines extend.

8. The article according to claim 6, wherein the fine steps are periodically arranged in the direction in which the lattice lines extend.

9. The article according to claim 6, further comprising a plurality of display parts each including the lattice lines,
wherein the display parts include a display part in which at least either an interval between the lattice lines that are adjacent to each other or a direction in which the lattice lines extend varies.

10. The article according to claim 6, further comprising a plurality of display parts each including the lattice lines,
wherein the display parts include a display part in which at least either a rule for arranging the fine steps or an arranged density of the fine steps varies.

* * * * *